United States Patent
Cherubini et al.

(10) Patent No.: US 8,054,736 B2
(45) Date of Patent: *Nov. 8, 2011

(54) STORAGE DEVICE HAVING FLEXIBLE ARCHITECTURE AND FREE SCALABILITY

(75) Inventors: Giovanni Cherubini, Rueschlikon (CH); Evangelos S. Eleftheriou, Zurich (CH); Theodor W. Loeliger, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 588 days.

This patent is subject to a terminal disclaimer.

(21) Appl. No.: 12/126,967

(22) Filed: May 26, 2008

(65) Prior Publication Data

US 2008/0225677 A1    Sep. 18, 2008

(51) Int. Cl.
*G11B 11/00* (2006.01)
(52) U.S. Cl. ......... 369/126; 369/100; 324/754; 324/756
(58) Field of Classification Search .................. 369/126, 369/100; 324/754, 756
See application file for complete search history.

(56) References Cited

U.S. PATENT DOCUMENTS

| | | | | |
|---|---|---|---|---|
| 5,053,995 A | * | 10/1991 | Kajimura et al. | 369/126 |
| 5,329,122 A | * | 7/1994 | Sakai et al. | 850/10 |
| 5,394,388 A | * | 2/1995 | Hatanaka et al. | 369/126 |
| 5,835,477 A | * | 11/1998 | Binnig et al. | 369/126 |
| 7,558,185 B2 | * | 7/2009 | Cherubini et al. | 369/126 |

* cited by examiner

*Primary Examiner* — Wayne Young
*Assistant Examiner* — Linh Nguyen
(74) *Attorney, Agent, or Firm* — Michael J. Buchenhorner; Vazken Alexanian

(57) ABSTRACT

A storage device according to the invention has flexible architecture and free scalability. It includes an address input and a data input. It also includes an address and data evaluation unit, which is formed in such a way that it controls a controllable switching means, wherein in operation the address and data evaluation unit depends on the signals of said address and data inputs. Finally, a read/write line for a read/write signal is provided, which can be applied to a local probe data storage unit via the controllable switching means.

14 Claims, 14 Drawing Sheets

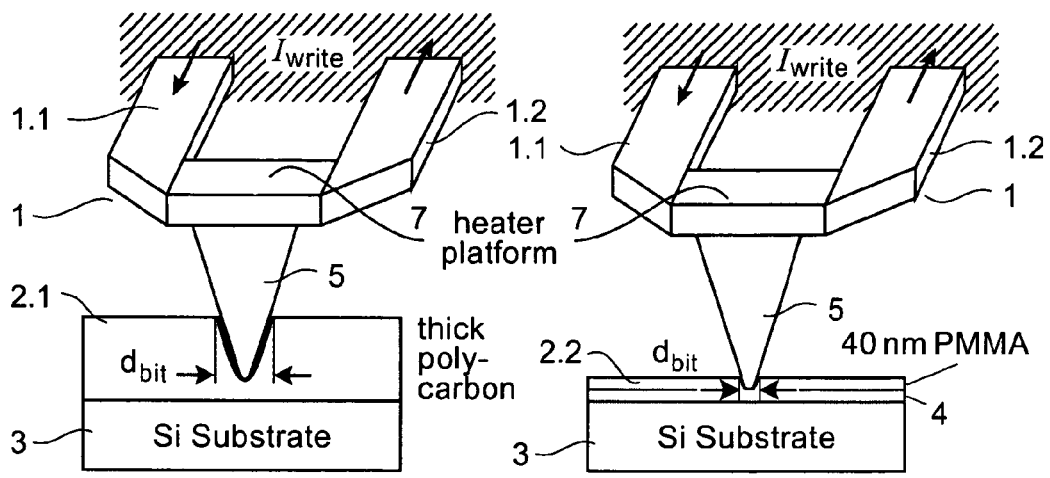
Fig. 1a   Fig. 1b
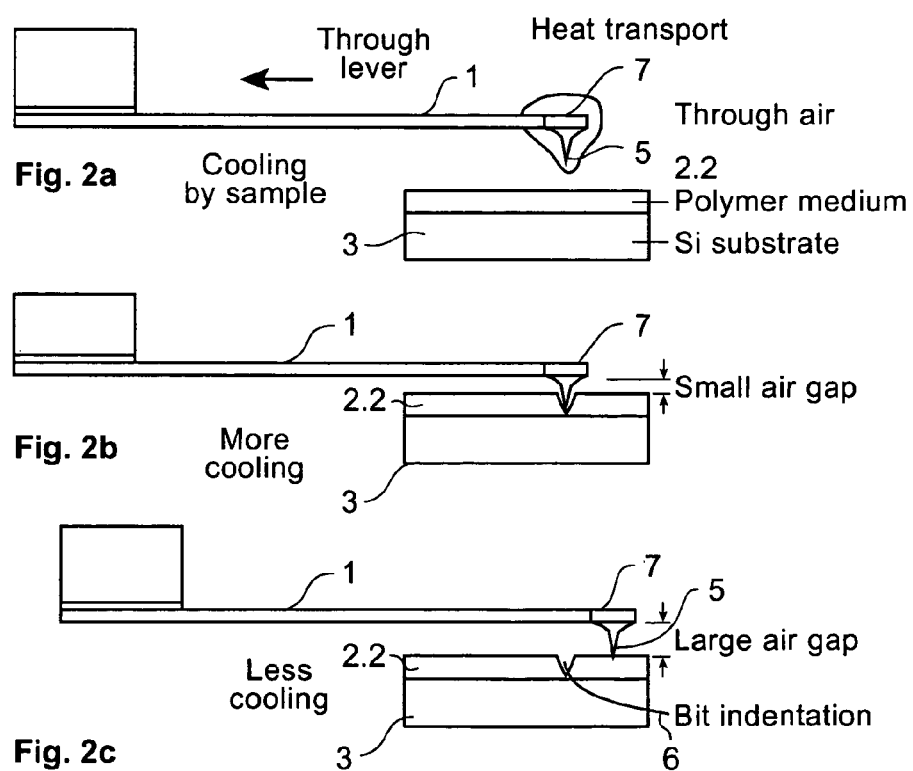
Fig. 2a   Fig. 2b   Fig. 2c

STORAGE DEVICE HAVING FLEXIBLE ARCHITECTURE AND FREE SCALABILITY

TECHNICAL FIELD

The present invention relates to a storage device and to methods for operating a storage device. The storage device comprises a local probe data storage unit.

BACKGROUND OF THE INVENTION

In P. Vettiger et al., "The 'Millipede'—More than one thousand tips for future AFM data storage," IBM Journal of Research and Development, vol. 44, pp. 323-340, May 2000 an atomic force microscope (AFM)-based data storage concept is envisioned that shows ultrahigh density, terabit capacity, small form factor, and high data rate. Ultrahigh storage density can be achieved by applying a thermo-mechanical technique for storing and reading back data in very thin polymer films by means of a local probe. With this technique, 30-40 nm-sized bit indentations of similar pitch size can be made by a single tip of a cantilever in a thin (50 nm) polymethylmethacrylate (PMMA) layer, resulting in a data storage density of 400-500 Gb/in$^2$ (62.0-77.5 Gb/cm$^2$). High data rates can be achieved by parallel operation of probes of a large two-dimensional (2D) AFM array that have been batch-fabricated by silicon surface-micromachining techniques. The very large scale integration (VLSI) of the micro/nanomechanical devices, e.g. cantilevers and tips, on a single chip leads to a 2D array of e.g. 32×32 (1024) AFM cantilevers with integrated write/read storage functionality. Time-multiplexed electronics control the write/read storage cycles for parallel operation of the Millipede array chip. Initial areal densities of 100-200 Gb/in$^2$ (15.5-31.0 Gb/cm$^2$) have been achieved with the 32×32 array chip. The data storage material can be polymers or other media, and not excluding magnetics.

Until now, no architecture of a local probe based storage is known which allows free scalability and a random addressing scheme.

SUMMARY OF THE INVENTION

Therefore, an aspect of the invention is to provide a storage device for storing data which storage device shows a flexible architecture and free scalability. An example storage device according to the invention comprises a local probe data storage unit, an address input and a data input. It further comprises an address and data evaluation unit for controlling a controllable switch dependent on signals received from the address input and the data input. There is provided a read/write input connected to the local probe data storage unit via the switch for applying a read/write signal to the local probe data storage unit dependent on a switching state of the controllable switch. The read/write signal can be a read signal and/or a write signal. In a further embodiment of the invention, the storage device comprises an analog-digital converter for converting a sensed signal delivered from the cantilever.

According to another embodiment of a storage device according to the invention, the address and data evaluation unit, the memory unit, the controllable switch and the local probe data storage unit form a storage cell. Furthermore, the storage device comprises a defined number of storage cells which form a storage cell array. Herewith, the data access can be accelerated because the data can be accessed in parallel. The more storage cells are provided in the storage cell array the higher the data transfer rate is.

BRIEF DESCRIPTION OF THE DRAWINGS

The invention and its embodiments will be more fully appreciated by reference to the following detailed description of presently advantageous but nonetheless illustrative embodiments, in accordance with the present invention when taken in conjunction with the accompanying drawings, in which:

FIG. 1a and FIG. 1b show perspective views of a local probe data storage unit,

FIGS. 2a, 2b, 2c show in a cross section, a local probe data storage unit in operation, thereby showing the principle of AFM thermal sensing.

Figure 3:
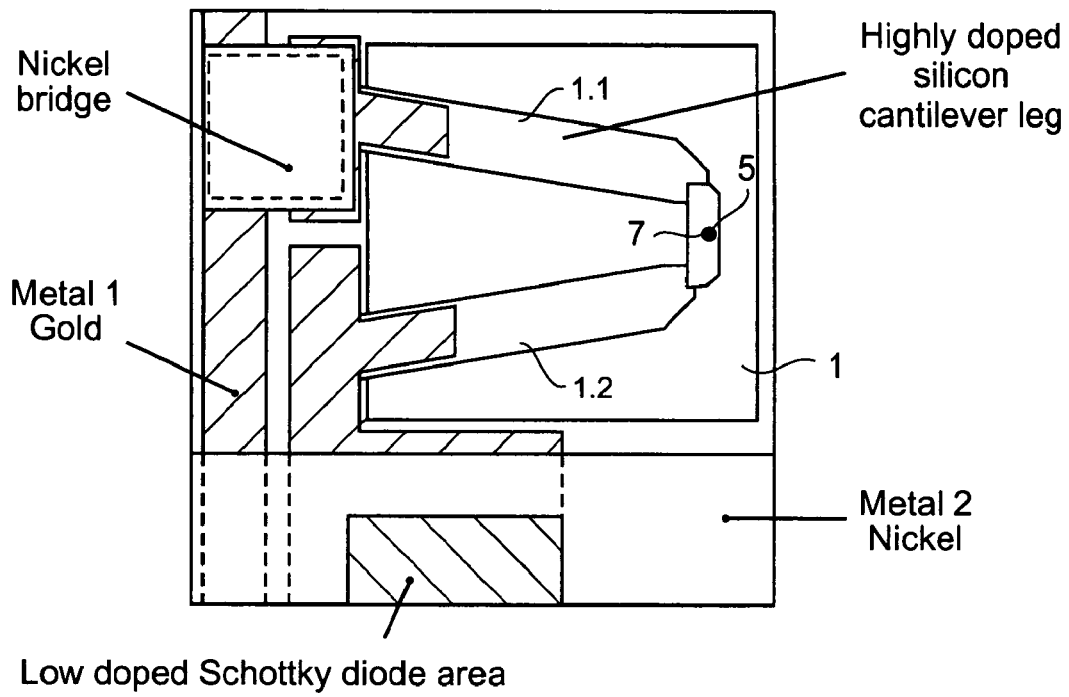
FIG. 3 shows a local probe data storage unit in a top view.

REFERENCE SYMBOLS 1 cantilever
1.1 first leg
1.2 second leg
2.1 polycarbon layer
2.2 PMMA layer
3 substrate
4 photoresist
5 tip
6 indentation
7 heater platform
8 diode
9 bending element
10 cantilever array 10.1 cantilever cell number 1
10.16 cantilever cell number 16
11 linking element or plate
13 marks
21 row lines
22 row lines
23 column lines
24 column lines
25 CMOS array
25.1 CMOS cell number 1
25.16 CMOS cell number 16
26 controllable switching means
27 driving switch memory
28 address and data evaluation unit
29.1, 29.16 converters
30.1, 30.2 data output buffer
31 multiplexer
32 address decoder
33.1-33.16 switch
34.1-34.16 switch
35 first subdevice
36 second subdevice
37 third subdevice
38 fourth subdevice
40 A/D converter
41 A/D converter
42 sample and hold element
43 control element
44.1, 44.2 switch
45 current limiter
46 address decoder
47.1, 47.2 data input buffer
48 demultiplexer
49 controller unit

DETAILED DESCRIPTION OF THE INVENTION

The present invention provides storage devices for storing data. The storage devices show a flexible architecture and free scalability. According to one aspect of the invention, the object is achieved by a storage device with the features scribed herein. An example of a storage device according to the invention comprises a local probe data storage unit, an address input and a data input. It further comprises an address and data evaluation unit for controlling a controllable switch dependent on signals received from the address input and the data input. There is provided a read/write input connected to the local probe data storage unit via the switch for applying a read/write signal to the local probe data storage unit dependent on a switching state of the controllable switch. The read/write signal can be a read signal and/or a write signal.

Advantageously, the local probe data storage unit of the storage device according to the invention comprises a storage medium and a tip for reading and writing data from and into a storage medium respectively. The tip is advantageously mounted on a cantilever which cantilever can be formed as a two-legged cantilever or a three-legged cantilever. The read/write signal is typically applied to the cantilever. For the option of the three-legged cantilever, a first leg and a second leg of such cantilever are used for transmitting a read signal, whereas the second leg and a third leg are used for transmitting a write signal. This latter embodiment shows the advantage that the heating current for heating the tip of the cantilever during the reading phase can be adjusted separately from the heating current during the writing phase. Therefore, a first heating current for reading and a second heating current for writing can be applied. Advantageously, the address and data evaluation unit of the storage device advantageously comprises an AND-gate.

As a further improvement to the storage device, a current limiter can be provided which current limiter is connected to the local probe data storage unit—e.g. its cantilever—for limiting a current of the read/write signal through the cantilever.

Advantageously, the storage device according to the invention comprises a memory unit connected to the address and data evaluation unit and to the switch for intermediately storing data. Thus, the time during which other components, e.g. a processor, have to wait can be reduced: As soon as the data has been stored in the driving memory unit, the address and data bus can be accessed again by the processor. The data is stored intermediately in the driving memory unit until it is safely transferred to the storage medium. Advantageously, the memory unit of the storage device comprises a flip-flop. Advantageously, the address and data evaluation unit, the controllable switch and the memory unit are part of an integrated circuit, wherein the integrated circuit can be a CMOS circuit. In some embodiments of the invention, the storage device comprises an analog-digital converter for converting a sensed signal delivered from the cantilever.

According to another embodiment of a storage device according to the invention, the address and data evaluation unit, the memory unit, the controllable switch and the local probe data storage unit form a storage cell. Furthermore, the storage device comprises a defined number of storage cells which form a storage cell array. Herewith, the data access can be accelerated because the data can be accessed in parallel. The more storage cells are provided in the storage cell array the higher the data transfer rate is.

In an advantageous embodiment of the storage device, a defined number of storage cells form a storage subdevice. There can be provided a plurality of storage subdevices. Each storage subdevice can be accessed separately. Herewith, a storage subdevice can be used for writing data into the storage medium while at the same time another storage subdevice can be used for reading data from the storage medium. Thus, it gets possible to simultaneously read and write data. If the storage device according to the invention comprises storage subdevices it advantageously also comprises a controller unit for controlling the access to the storage subdevices.

According to a further embodiment of the invention, the storage device comprises a multiplexer, which is connected to data outputs of the storage subdevices. The multiplexer takes care, that the data words which are delivered from the storage subdevices in parallel are forwarded in the right order.

The storage device according to some embodiments of the invention comprises an address decoder for addressing the storage cell array when data shall be read from the storage cell array. The storage device can also comprise a further address decoder for addressing the storage cell array when data shall be written into the storage cell array. As further improvement to the storage device, a data input buffer can be provided for intermediately storing the input data before it is stored in the storage cell. In a further embodiment of the storage device according to the invention, for each column of the storage cell array an A/D-converter can be provided. Alternatively thereto, the storage device according to the invention can comprise an A/D-converter, which is provided at the data output of the storage cell array.

In another embodiment of the storage device according to the invention, a further memory unit for intermediately storing data is provided. Furthermore, a further switch is provided, which is controlled by the further memory unit, wherein via the further switch the write line of the three-legged cantilever can be supplied with a write signal.

Furthermore, in some embodiments a method for storing data in the storage device comprises the step of: after the desired address is applied to the address input and the data is applied to the data input, a heating current is applied to the read/write input. Finally, in some embodiments a method for reading data from the storage device comprises the following step. After the desired address is applied to the address input, a heating current is applied to the read/write input.

A local probe data storage unit of a storage device based on thermo-mechanical AFM comprises a cantilever 1, a tip 5 mounted at one end of the cantilever 1, and a storage medium 2.1 or 2.2 as shown in FIGS. 1a and 1b respectively. The cantilever 1 as shown in FIGS. 1a and 1b has two legs 1.1 and 1.2 through which a current Iwrite is flowing if data shall be written into the storage medium 2.1 or 2.2 via the tip 5. The storage medium 2.1 can for example be a thick polycarbon layer 2.1 mounted on a silicon (Si) substrate 3 as shown in FIG. 1a or a PMMA layer 2.2 mounted on a cross-linked hard-backed photoresist layer 4 which in turn is arranged on the silicon substrate 3 as shown in FIG. 1b. The PMMA layer 2.2 may have a thickness of 40 nm, while the photoresist layer 4 may have a thickness of 70 nm. Herewith, ultrahigh storage density can be achieved by applying a thermo-mechanical technique for storing and reading back data in the polymer film 2.1 or 2.2 by means of a local probe, the probe comprising the tip 5.

In the following the procedure of writing data on the storage medium of this local probe data storage device is explained. Thermo-mechanical writing includes a combination of applying a local force between the cantilever 1 with the tip 5 and the polymer layer 2.1 or 2.2, and of softening the polymer layer 2.1 or 2.2 by local heating. Therefore, the write current Iwrite heats up a heater platform 7 from which heater platform 7 the tip 5 becomes heated. Initially, the heat transfer from the tip 5 to the polymer layer 2.1 or 2.2 through a small contact area $d_{bit}$ is very poor, improving as the contact area increases. This means that the tip 5 must be heated to a relatively high temperature (about 400° C.) to initiate the melting process. At least once melting has commenced, the tip 5 is pressed into the polymer 2.1 or 2.2 by way of applying a force between the cantilever 1 and the polymer layer 21. or 2.2, which results in an increase of the heat transfer to the polymer layer 2.1 or 2.2, and which results in an increase of the volume of melted polymer, and hence in an increase of the bit size $d_{bit}$.

According to the embodiment shown in FIG. 1a, at the beginning of the writing process, only about 0.2% of the heating power is used in the very small contact zone (10-40 nm$^2$) to melt the polymer 2.1 locally, whereas about 80% is lost through the cantilever legs 1.1 and 1.2 to the chip body and about 20% is radiated from the heater platform through the air gap to the medium and the substrate 3. After melting has started and the contact area $d_{bit}$ has increased, the heating power available for generating the indentations increases by at least ten times to become 2% or more of the total heating power. With this highly nonlinear heat-transfer mechanism, it is difficult to achieve small tip penetration and thus small bit sizes $d_{bit}$, as well as to control and reproduce the thermo-mechanical writing process.

This situation can be improved if the thermal conductivity of the substrate 3 is increased, and if the depth of tip penetration is limited. The use of the very thin polymer layer 2.2 deposited on the Si substrate 3 improves these characteristics, as illustrated in FIG. 1b. The hard Si substrate prevents the tip 5 from penetrating farther than the film thickness allows, and it enables more rapid transport of heat away from the heated region because Si is a much better conductor of heat than the polymer 2.2. The Si substrate 3 can be coated with a 40 nm film of polymethylmethacrylate (PMMA). With that bit sizes $d_{bit}$ ranging between 10 and 50 nm can be achieved. In order to reduce tip wear during writing, a 70 nm layer of cross-linked photoresist (SU-8) 4 can be introduced between the Si substrate 3 and the PMMA film 2.2. The photoresist 4 acts as a softer penetration stop that avoids tip wear but remains thermally stable.

Imaging and reading can be achieved using a thermo-mechanical sensing concept. The heater cantilever 1 is given the additional function of a thermal readback sensor by exploiting its temperature-dependent resistance. The resistance R increases nonlinearly with heating power and temperature respectively from room temperature to a peak value of 500-700° C. The peak temperature is determined by the doping concentration of the heater platform, which ranges from $1 \times 10^{17}$ to $2 \times 10^{18}$. Above the peak temperature, the resistance drops as the number of intrinsic carriers increases because of thermal excitation. For sensing, the resistor R is operated at about 350° C., a temperature that is not high enough to soften the polymer 2.1 or 2.2, as is necessary for writing. The principle of thermal sensing is based on the fact that the thermal conductance between the heater platform 7 and the storage substrate 3 changes according to the distance between them. The medium between the cantilever 1 and the storage substrate 3, e.g. air, transports heat from one side to the other, as shown in FIG. 2a. When the distance between the heater 7 and the sample is reduced as the tip 5 moves into a bit indentation 6 (see FIG. 2b), the heat transport through air will be more efficient, and the heater's temperature and hence its resistance R will decrease. Thus, changes in temperature of the continuously heated resistor R are monitored while the cantilever 1 is scanned over data bits, providing a means of detecting the bits. Under typical operating conditions, the sensitivity of thermomechanical sensing is even better than that of piezoresistive-strain sensing, which is not surprising because thermal effects in semiconductors are stronger than strain effects.

Erasing and Rewriting:

In addition to ultradense thermo-mechanical writing and reading operations, erasing and rewriting capabilities of polymer storage media is also possible. Thermal reflow of storage fields is achieved by heating the storage medium 2.1 or 2.2 to about 150° C. for a few seconds. The smoothness of the reflowed storage medium 2.1 or 2.2 allows multiple rewriting of the same storage field. This erasing process does not erase single bits; it will erase larger storage areas.

Figure 5:
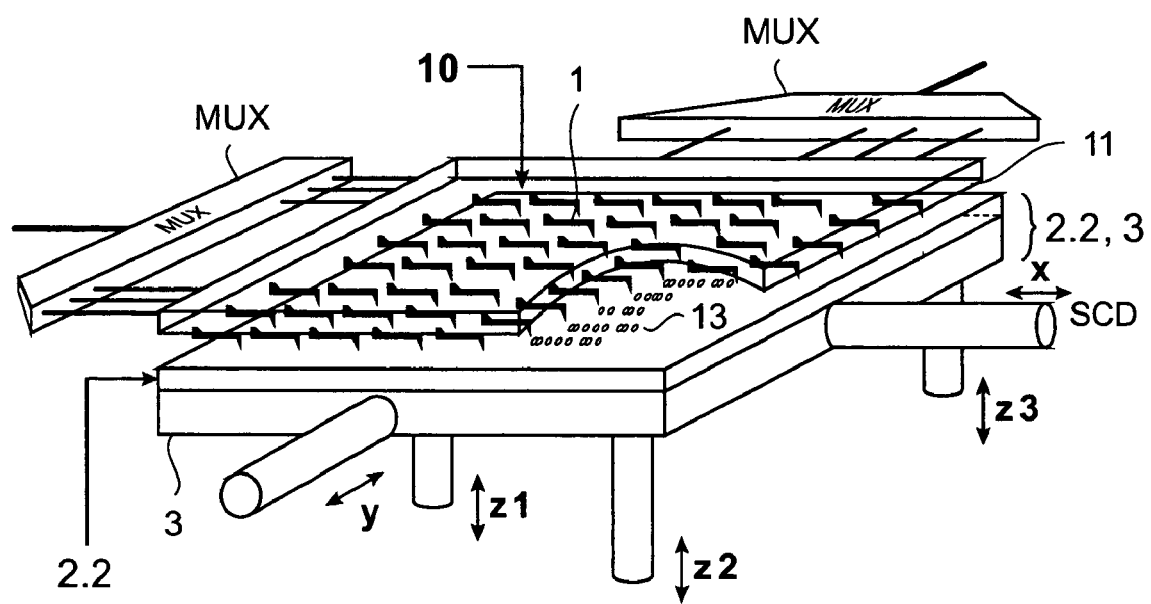
FIG. 5 shows a perspective view of an AFM based data storage device comprising an array of storage cells.

It is possible to arrange a number of single cantilevers in a cantilever array 10, wherein the whole cantilever array 10 can be positioned relatively to the storage medium 2.2 by means of an actuator—the corresponding movements are indicated by arrows z1, z2 and z3 according to FIG. 5.

Figure 4:
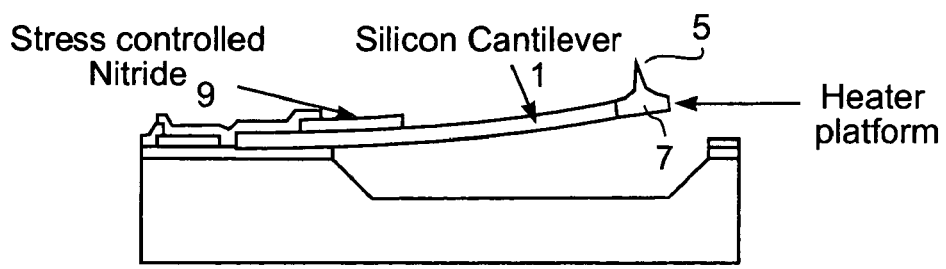
FIG. 4 shows a side view of a local probe of a local probe data storage unit.

Since the heater platform 7 functions as a write/read element of the local probe data storage unit and no individual cantilever actuation is required, the basic local probe data storage unit becomes a simple two-terminal device, as shown in FIG. 3 and FIG. 4.

With regard to an array comprising multiple local probe data storage units, the storage area and the x/y cantilever pitch of one individual local probe data storage unit is e.g. 92 µm×92 µm, which results in a total array size of less than 3 mm×3 mm for a storage device comprising 1024 local probe data storage units each of them having a cantilever and a tip, and each of the cantilever/tip combination scanning an associated area of the storage medium.

The cantilever 1 can entirely be fabricated of silicon for good thermal and mechanical stability. It comprises the heater platform 7 with the tip 5 on top, the legs 1.1 and 1.2 acting as a soft mechanical spring, and an electrical connection to the heater 7. The electrical connections are highly doped in order to minimize interconnection resistance and might replace any metal wiring on the cantilever 1 in order to eliminate electromigration and parasitic z-actuation of the cantilever due to the bimorph effect. The resistive ratio between the heater 7 and the silicon interconnection sections should be as high as possible; currently the highly doped interconnections show an ohmic resistance of 400Ω and the heater platform shows an ohmic resistance of 11 kΩ at 4 V reading bias.

FIG. 5 shows a perspective view of a storage device comprising an array of local probe data storage units. The storage medium 2.2, e.g. a polymer layer, is mounted on the substrate 3 and is facing a probe array 10 having a plurality of probes, each comprising a spring cantilever 1 and a tip. The probes 1 are mechanically linked to a linking element 11 having the shape of a plate. The linking element 11 is transparent and cut open at one edge for demonstration purposes solely. The probes are formed as shown in FIG. 1 to 4.

In order to read data from the probe array 10, the polymer layer 2.2 is moved relative to the probe array 10 at a constant velocity. The scanning velocity and the distance between marks determine the data rate of the system in marks/bits read or written per second. As already mentioned above, reading and writing is accomplished thermo-mechanically. Solely for demonstration purposes, marks 13 are shown only in a confined area of the storage medium 2.2 in FIG. 5.

In the following, an architecture for a local probe data storage device is illustrated that is based on a random access addressing scheme. The disclosed architecture according to the invention provides full scalability for use in an arbitrary two-dimensional read/write array and solves efficiently the problems of parallel operation, dynamic cell allocation, simultaneous read and write operation, wiring complexity and size. In this architecture, a cell-level (per cell) or chip-level (global) analog-to-digital conversion or any intermediate approach is possible thus allowing a trade-off between implementation complexity and speed of signal conversion. Trade-offs between complexity and functionality are illustrated by various embodiments of the disclosed architecture.

Figure 6:
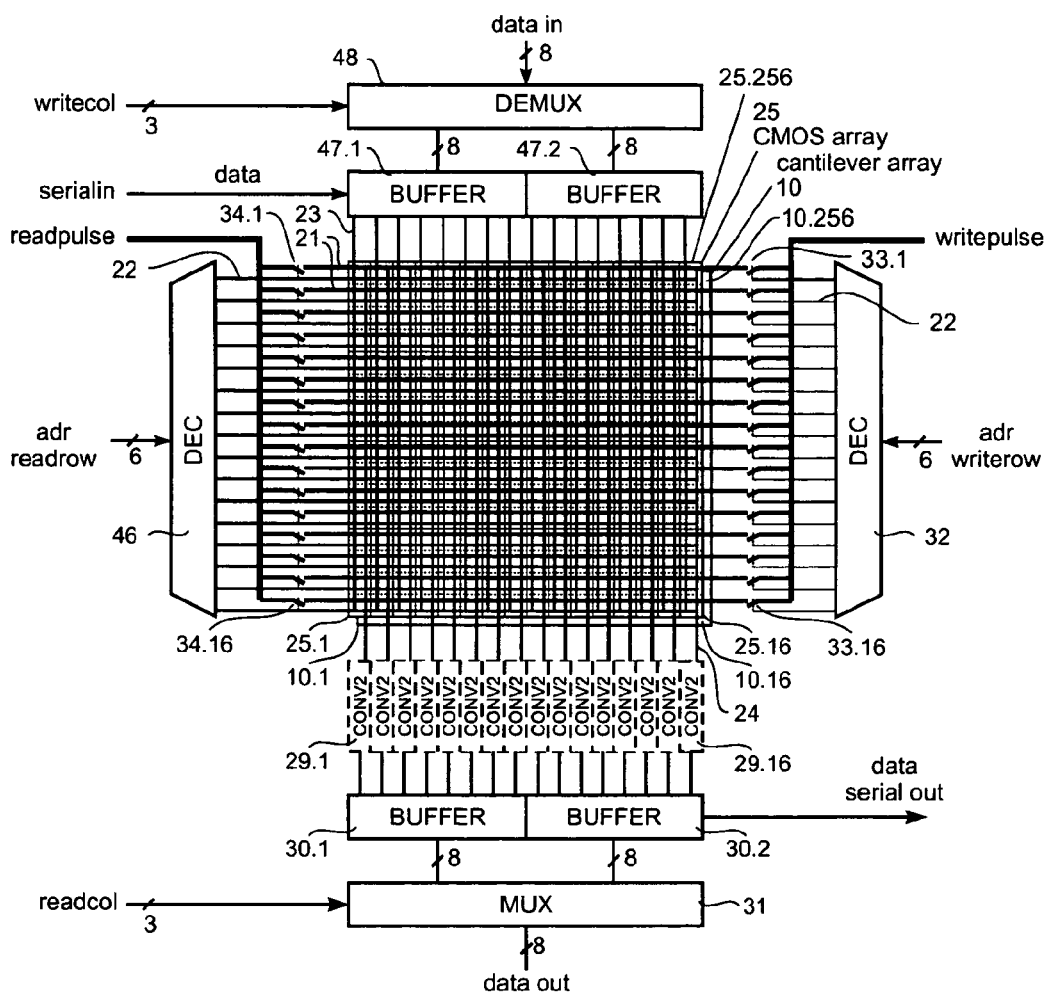
FIG. 6 shows a chip architecture for driving a cantilever array according to an embodiment of the present invention.
Figure 12:
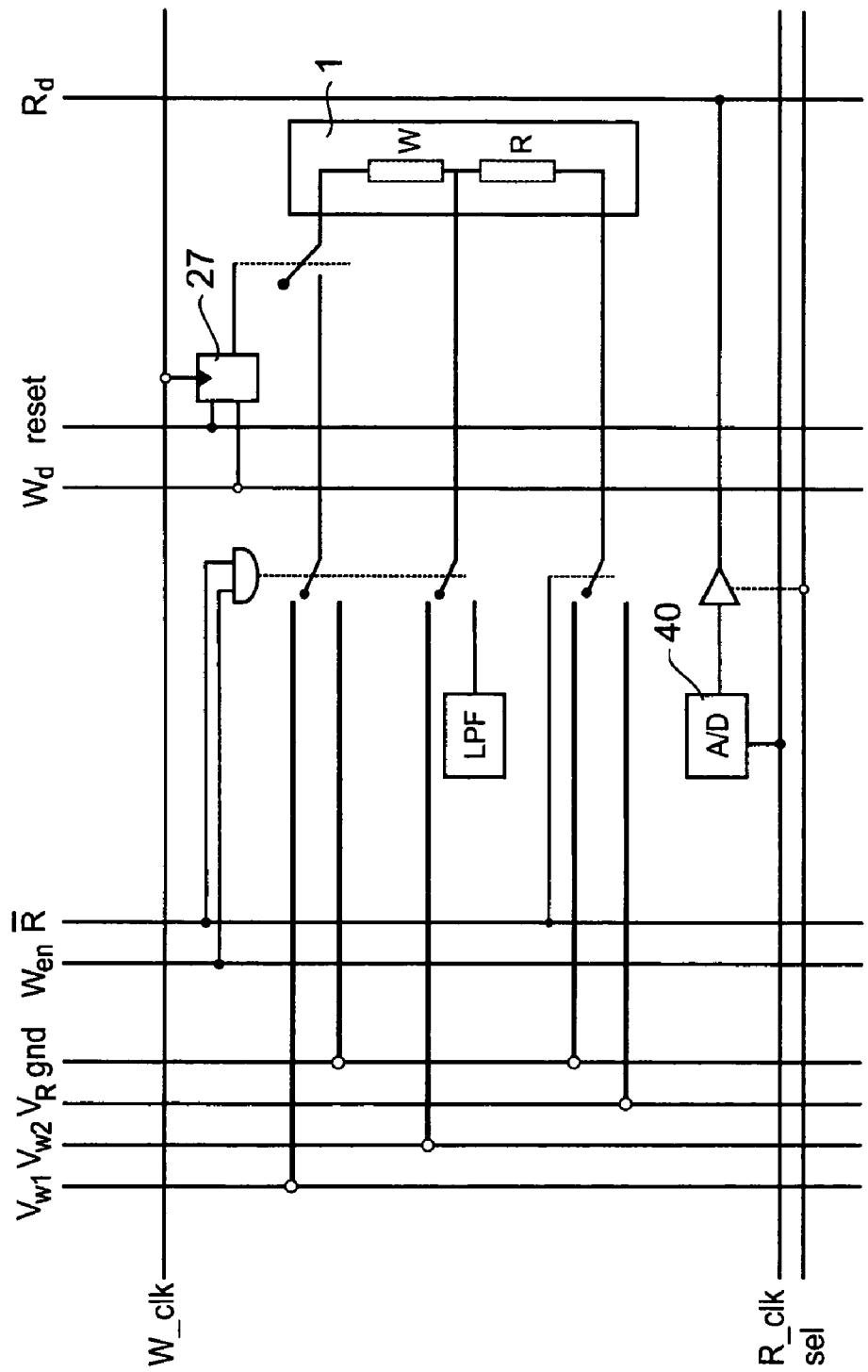
FIG. 12 shows an architecture of a single storage cell for the embodiment of FIG. 11 and a cantilever having three legs.

The aforementioned architectural issues are relevant to two-dimensional local probe data storage devices that are limited in speed performance, power consumption, cell size, probe signal level, or a combination of all of the above. A typical application is the AFM-based data storage device as described in P. Vettiger et al., "The 'Millipede'—More than one thousand tips for future AFM data storage," IBM Journal of Research and Development, vol. 44, pp. 323-340, May 2000. As already described above, it may comprise arrays of thousands of storage cells 25.1, 10.1 (see FIG. 7), each having a size of the order of 100 μm times 100 μm. A storage cell typically comprises a local probe data storage unit 10.1 and corresponding wiring and electronics. In this device, a storage cell array 25, 10 as shown in FIG. 6 integrated in complementary metal oxide semiconductor (CMOS) technology fitting to the probe array provides relatively large read and write driving currents to the probe units 10.1-10.256 and converts the analog readback signals including the recorded information to digital readout values. The local probe data storage units 10.1-10.256 can comprise AFM cantilevers using thermomechanical effects to read and write data from and to very thin polymer films. Simple two-leg cantilevers include single heat resistors and use the same connections for the read and the write operation. Three-legged cantilevers as shown in FIG. 12 include two separate heat resistors R and W that have one connection in common and two different connections for the read and the write operation. Thermo-mechanical sensors typically require relatively high currents in the order of 1 mA for both read and write operations. In addition, the thermal time constant is of the order of 1 μs. The high currents require high conductivity wires, switches and connections from and to the cantilevers, which results in considerable area for the driving circuitry. Therefore, the area of the driving circuitry in a storage cell 10.1, 25.1 is a critical parameter that needs to be minimized. On the other hand, high data rates are achieved by operating in parallel many storage cells.

Figure 7:
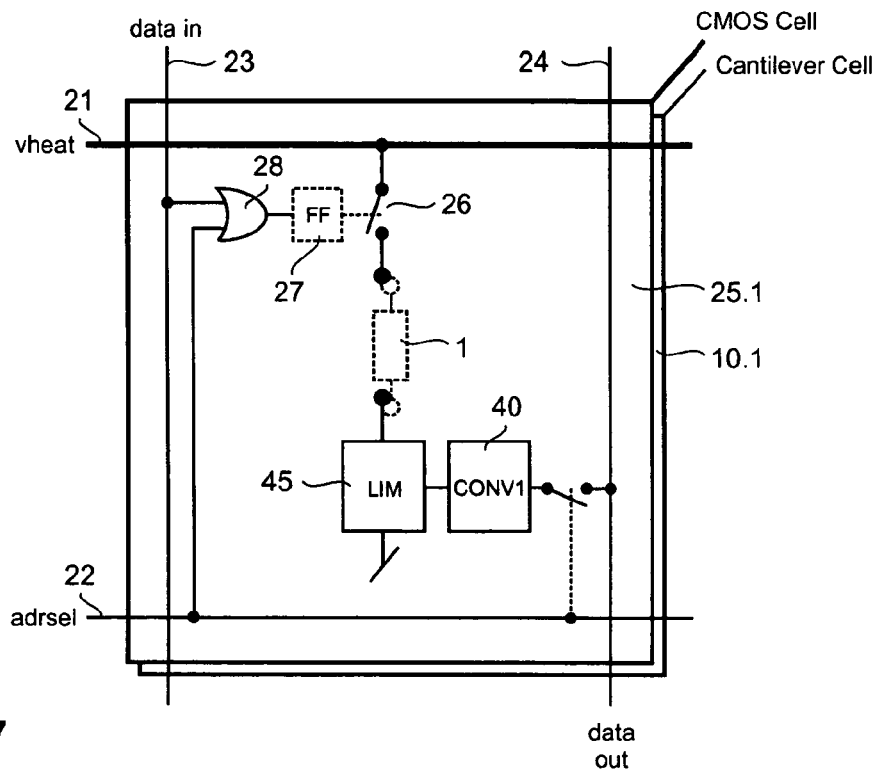
FIG. 7 shows an architecture of a single cell for driving a cantilever according to an embodiment of the present invention.

The proposed architecture shown in FIG. 7 features local (per cell) driving switch memories 27—also called memory units 27—that are loaded during short configuration periods (FIGS. 8 and 9) which periods do not overlap with the normal read/write operations of the storage device. This allows application specific dynamic cell allocation and sub-array (subdevice) parallel operation. There is provided one local driving switch memory 27 per storage cell 10.1, 25.1 controlling the state of the driving switch 26. For configuration, each local driving switch memory 27 is accessed with high speed in a RAM (Random Access Memory)-like mode. During read/write operations, the driving read/write signal is applied via the line 21 and the switch 26 does not have to be addressed. This allows selecting any completely random subset of the total storage array 25, 10 to work in parallel.

A two-sided row-wise read/write driving scheme provides simultaneous read and write operation in the storage array 25, 10 and reduces area consumption of the driving circuit elements in each storage cell. The read/write signals are applied to complete rows using identical wires 21 for read and write operation. One side of the storage array 25, 10 is used for read driving signal application whereas the other side provides the appropriate circuitry for write driving signals. This allows operating each row independently for read or writing using the same driving circuitry in the storage cells.

The proposed architecture yields highest flexibility when using cell-level read conversion, where the complete read signal detection is implemented in each storage cell. However, this approach may lead to a higher complexity of the read conversion circuit or to a higher power consumption. Therefore, a block of several storage cells sharing the same read conversion circuitry mostly preserves flexibility and at the same time relaxes area constraints and reduces power consumption. All the storage cells of one block are best located in the same column in order not to restrict parallel operation in the row. Thus, the proposed block-level read conversion achieves quasi-cell-level operation.

One embodiment of the proposed chip architecture is illustrated in FIG. 6 showing a CMOS array 25 attached to a cantilever array 10 as an example. In this embodiment the CMOS array comprises 256 driving cells 25.1 to 25.256 each interconnected to a cantilever 1 (see FIG. 7) of the associated probe storage unit 10.1 to 10.256. The corresponding architecture of a single storage cell comprising a CMOS driving cell 25.1 and a probe storage unit 10.1 is illustrated in FIG. 7. A driving cell 25.1. typically comprises driving and/or addressing circuitry.

The chip architecture as shown in FIG. 6 features a row/column addressing scheme wherein the references 21 and 22 indicate the horizontal row lines and the references 23 and 24 the vertical column lines. With this chip architecture a random access to each storage cell and parallel access within rows equivalent to imaging and memory arrays is achievable. This layout implies minimum wiring complexity and provides full scalability. It supports the proven data input and output schemes of imaging and memory arrays.

Data can be either fed in parallel via a demultiplexer 48 to the column buffers 47.1 and 47.2 or in serial directly to the column buffers 47.1 and 47.2. Therefore, the column buffers 47.1 and 47.2 have the corresponding parallel and serial data inputs respectively. After a 16 bit data word has been completely loaded into the column buffers 47.1 and 47.2 it is intermediately stored there. After the read address and/or the write address and the data word have been applied via the decoders 46 and 32 and the buffers 47.1 and 47.2 respectively to the CMOS driving cells 25.1-25.256 a read pulse and/or a write pulse is generated for reading and/or writing the data into or from the storage medium 2.1 or 2.2 via the cantilevers of local probe storage unit 10.1-10.256. For reading out the data the signals delivered from the tips 5 of the cantilevers of local probe storage units 10.1-10.256 are converted by means of the analog-digital (A/D) converters 29.1 to 29.16. The results thereof are intermediately stored in output buffers 30.1 and 30.2. Afterwards the data can be forwarded as serial data or as 8 bit data words.

Figure 8:
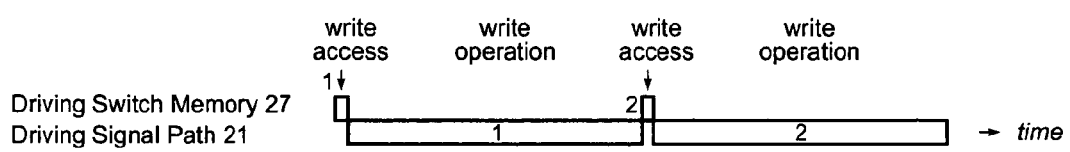
FIG. 8 shows a timing diagram for write operations in a single storage cell.
Figure 9:
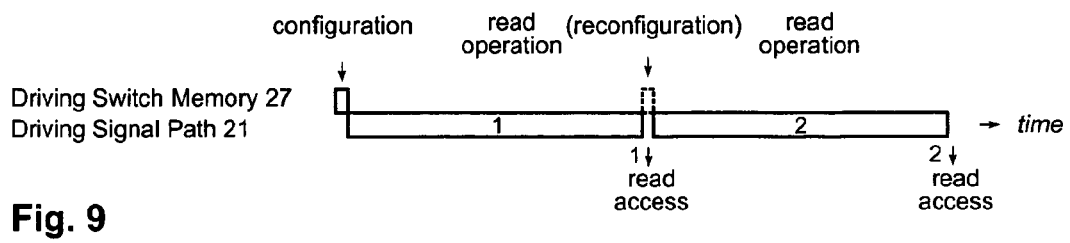
FIG. 9 shows a timing diagram for configuration and read operations in a single storage cell.

The architecture of a single storage cell 25.1, 10.1 shows a local driving switch memory 27 that controls a driving switch 26 for read and write operation. The local driving switch memory 27 can be a flip-flop (FF) whose input is connected to the output of an AND gate 28 and whose output is connected to the control input of the driving switch 26. If the storage cell 25.1, 10.1 is selected by the select line 22, i.e. by the corresponding address, the data received on the data input line 23 is first intermediately stored in the flip-flop 27. As soon as the controllable switch 26 is conducting a read/write pulse vheat is led via line 21 to the cantilever cell 10.1 for a determined period of time. The read/write pulse vheat can be for example a heating current for heating the heating platform 7 and the tip 5 of the cantilever 1. This provides free configuration of the array for read/write operation and fast read/write access. Free configuration supports sub-array parallel operation with fully random assignment. This is particularly useful in systems with dynamic workload adaptation and allows speed/power tradeoffs. Free configuration also allows interleaved operation with fully random assignment yielding a high level of freedom in probe operation. The local driving switch memory 27 represents a soft-wiring technique since the resulting storage cell access can be programmed. In addition, due to the local driving switch memory 27 the storage cell does not have to be addressed during read/write operation: Fast write access occurs before the write operation and fast read access after the read operation as illustrated in FIG. 8 and FIG. 9 respectively.

Figure 10:
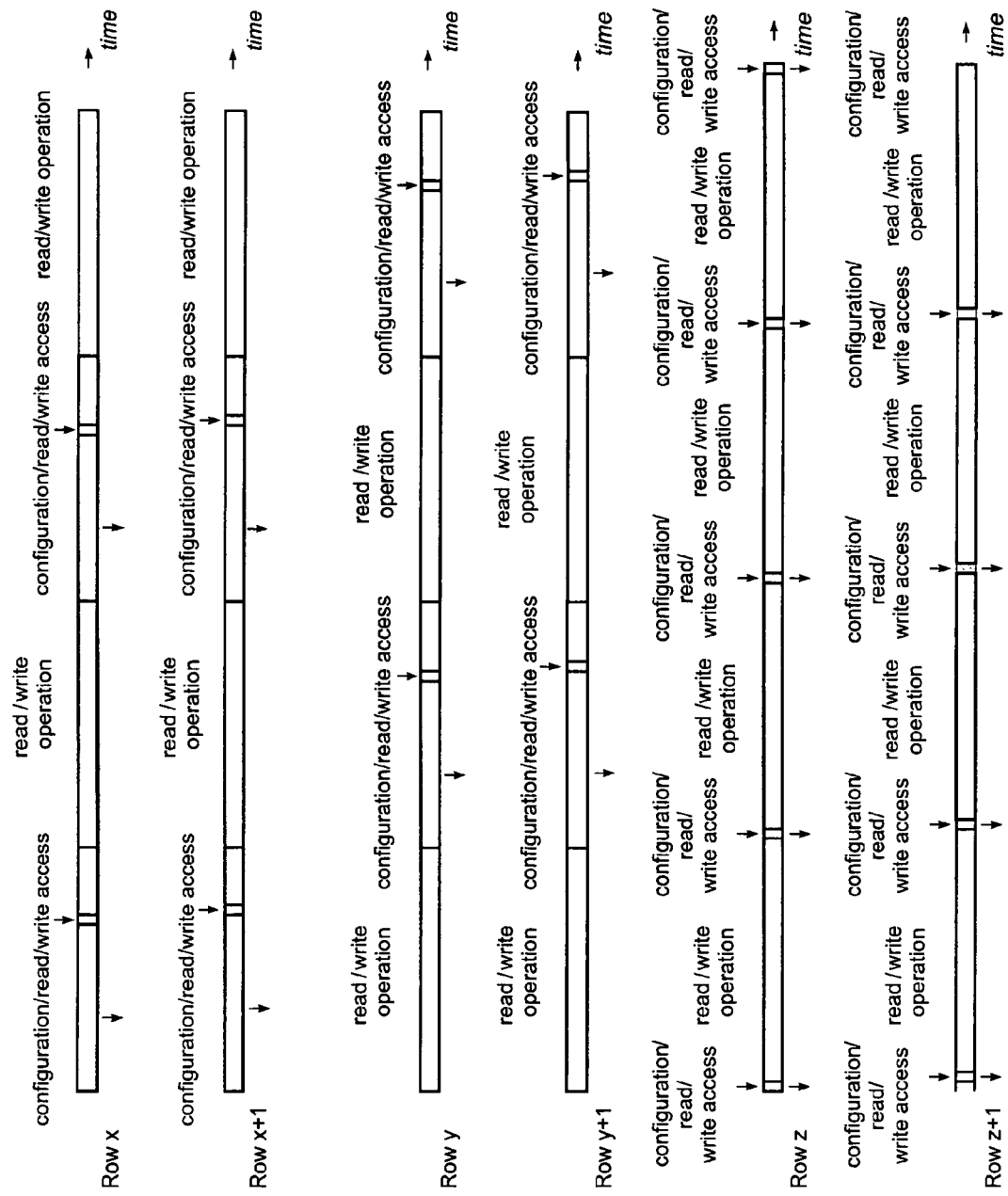
FIG. 10 shows a timing diagram for interleaved operations, wherein a simple interleaving is illustrated between row x and row y, and advanced interleaving is illustrated between row z and z+1.

The chip architecture in FIG. 6 includes a row-wise driving scheme (read/write pulse lines 21) yielding minimum wiring complexity and uses row-level driving switches 33.1-33.16 and 34.1-34.16. The switches 33.1-33.16 and 34.1-34.16 are not critical for implementation on the row level. This scheme supports a basic row-wise read and write operation. The simplest row-wise read operation does not even require any driving switches in the storage cells. The row-wise driving scheme also provides sub-array parallel operation and interleaved operation using a row-wise organization as illustrated in FIG. 10. The timing for simple interleaved operations is illustrated in FIG. 10 between row x and row y. Advanced interleaving is illustrated between row z and row z+1.

The chip architecture in FIG. 6 features dual-purpose read/write driving wires 21. There is a single driving circuitry in the storage cell area that serves for read and write operation. This saves chip area since driving wires, switches and connections typically require lots of space for achieving high conductivity.

A two-sided read/write driving scheme (left and right of the array) makes use of the identical read/write driving circuitry and achieves simultaneous read and write operation with minimum wiring complexity in a row-wise organization.

A row-wise readout scheme supports column-level read conversion. In this approach, a significant part of the read conversion circuit 29.1-29.16 is located in the column-level below the array (CONV2) and serves for all the storage cells in the specific column. This scheme relaxes area constraints for the read conversion circuitry and can be favorable with respect to mixed-signal design issues.

Cell-level read conversion achieves parallel operation within columns and greatly improves flexibility compared to the column-level approach. It includes the read conversion circuitry 40 in each individual storage cell (CONV1) as shown in FIG. 7.

A block-level read conversion scheme relaxes area constraints and preserves a certain level of parallel operation within columns. In this approach, a block of several storage cells in the same column shares the same read conversion circuitry among its storage cells.

The chip architecture features dual-purpose configuration/read selection wires 22. There is a single selection circuitry for both configuration and read access sharing the same row decoder/scanner 46.

The proposed architecture from FIGS. 6 and 7 is described for two-legged cantilevers. The architecture can easily be extended to three-leg cantilevers by duplicating the driving switch 26 in the storage cell and its local driving switch memory 27 and associated circuitry if required. A simpler approach can be used if the heat resistor R of the cantilever for the read operation is much higher than the heat resistor W for the write operation. Then, the two-leg cantilever architecture can be used for the write heat resistor W and the read heat resistor R can be directly attached to the driving wire of the row without driving switch.

FURTHER EMBODIMENTS

Figure 11:
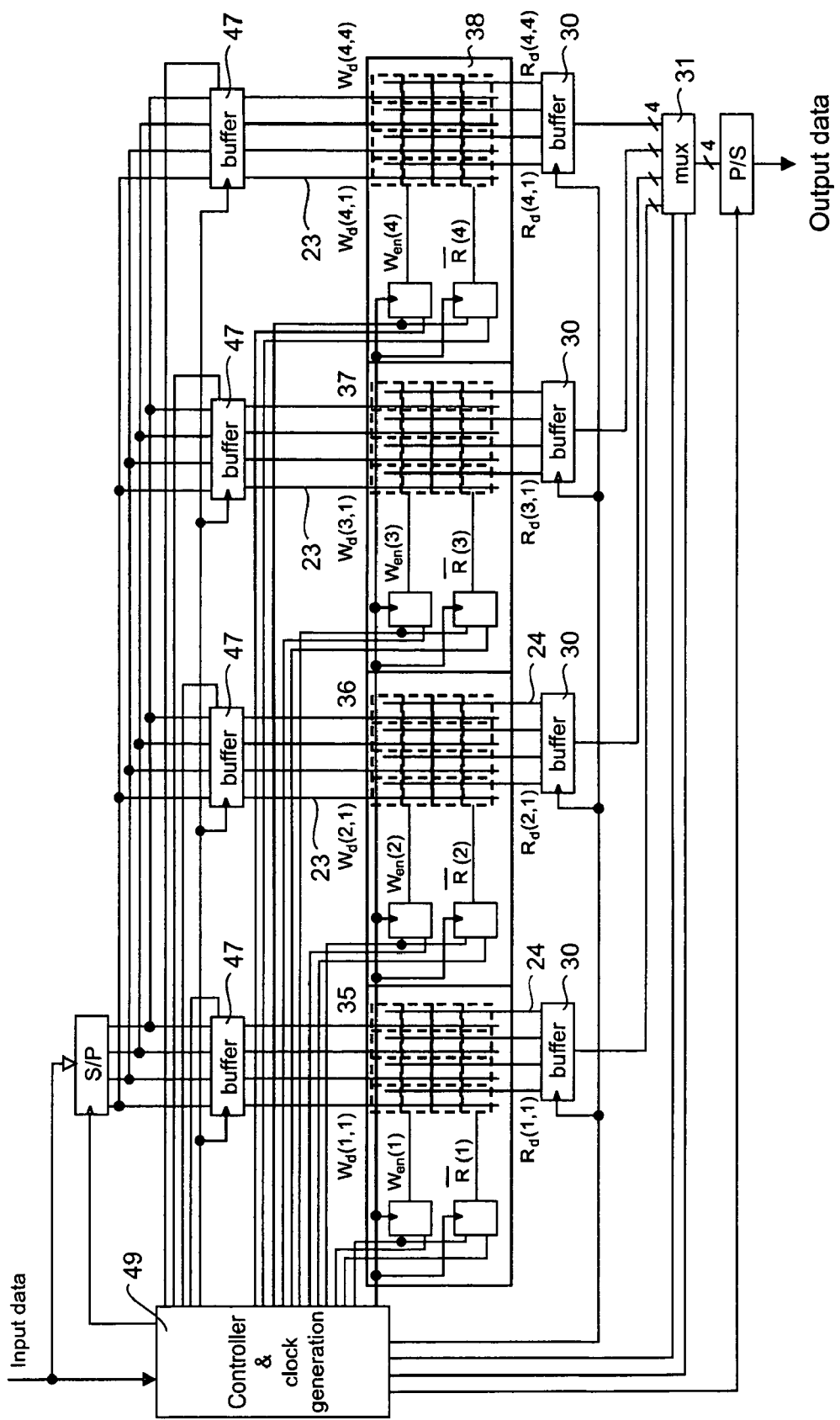
FIG. 11 shows an example embodiment of a chip architecture with four subdevices, each accessing a 4×4 storage cell and cantilever array.

A further embodiment of the disclosed scalable chip architecture is illustrated in FIG. 11 for a chip with four storage subdevices 35, 36, 37 and 38, each accessing a 4×4 storage cell array. The cell architecture, assuming a three-leg cantilever design, is shown in FIG. 12. In this embodiment, the row-wise read and write operations described above are performed within a storage subdevice. The write voltages $V_{W1}$ and $V_{W2}$, the read voltage $V_R$, and the ground gnd are globally provided to all storage cells in the chip. The signals $W_{en}(i)$ and $\overline{R}(i)$, wherein i=1, 2, 3, 4, determine whether the i-th storage subdevice must be configured for read or write, or remain idle. For example i=1 indicates in FIG. 11 the storage subdevice 35.

For write operation, the bits to be written are conveyed to the individual storage cells by the lines $W_d(i,j)$, wherein i,j=1, 2, 3, 4, and loaded row-wise on the driving switch memory (flip-flops) using the clock $W\_clk(i)$, wherein i=1, 2, 3, 4.

For read operation, each storage cell comprises an A/D converter 40 that generates a digital read back signal sample. Assuming no clock skew for a read operation, the sampling instants are determined for the entire subdevice by the clock R_clk. The samples are then presented at the output by the lines $R_d(i,j)$, wherein i,j=1, 2, 3, 4, using the row select signal sel(i), wherein i=1, 2, 3, 4.

Figure 13:
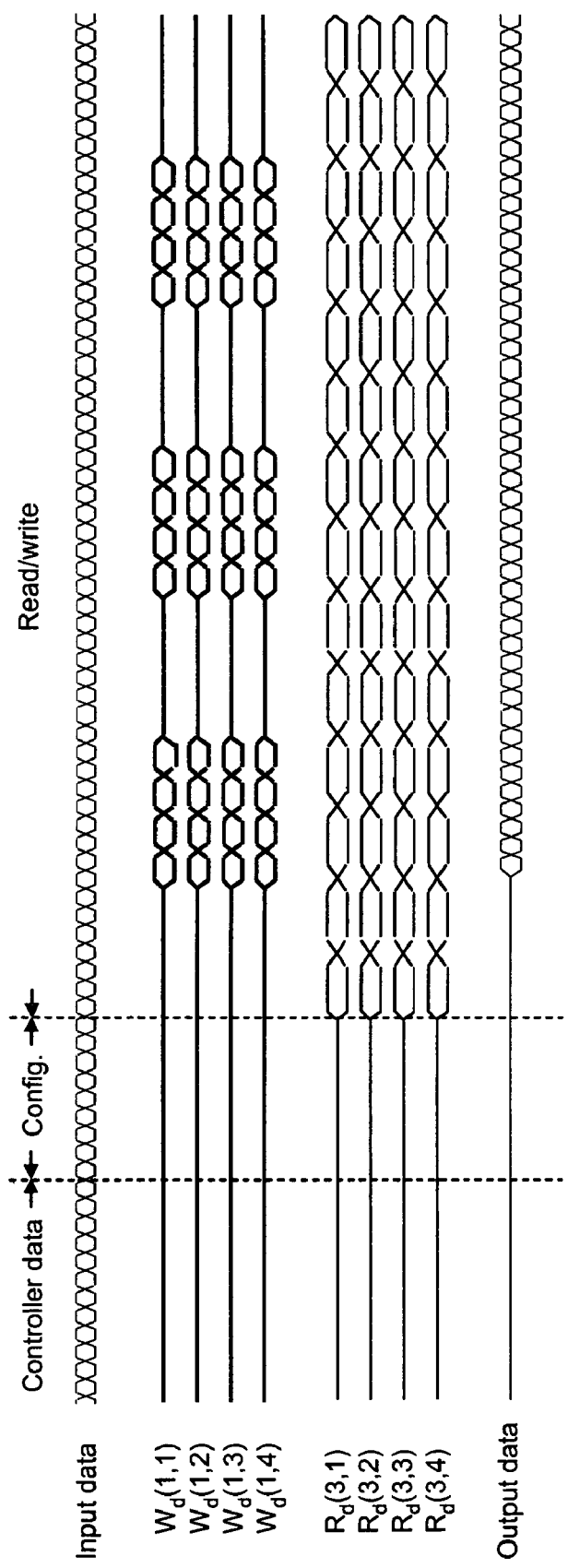
FIG. 13 shows a timing diagram for simultaneously reading from the third subdevice and writing into the first subdevice using the chip architecture of FIG. 11.
Figure 14:
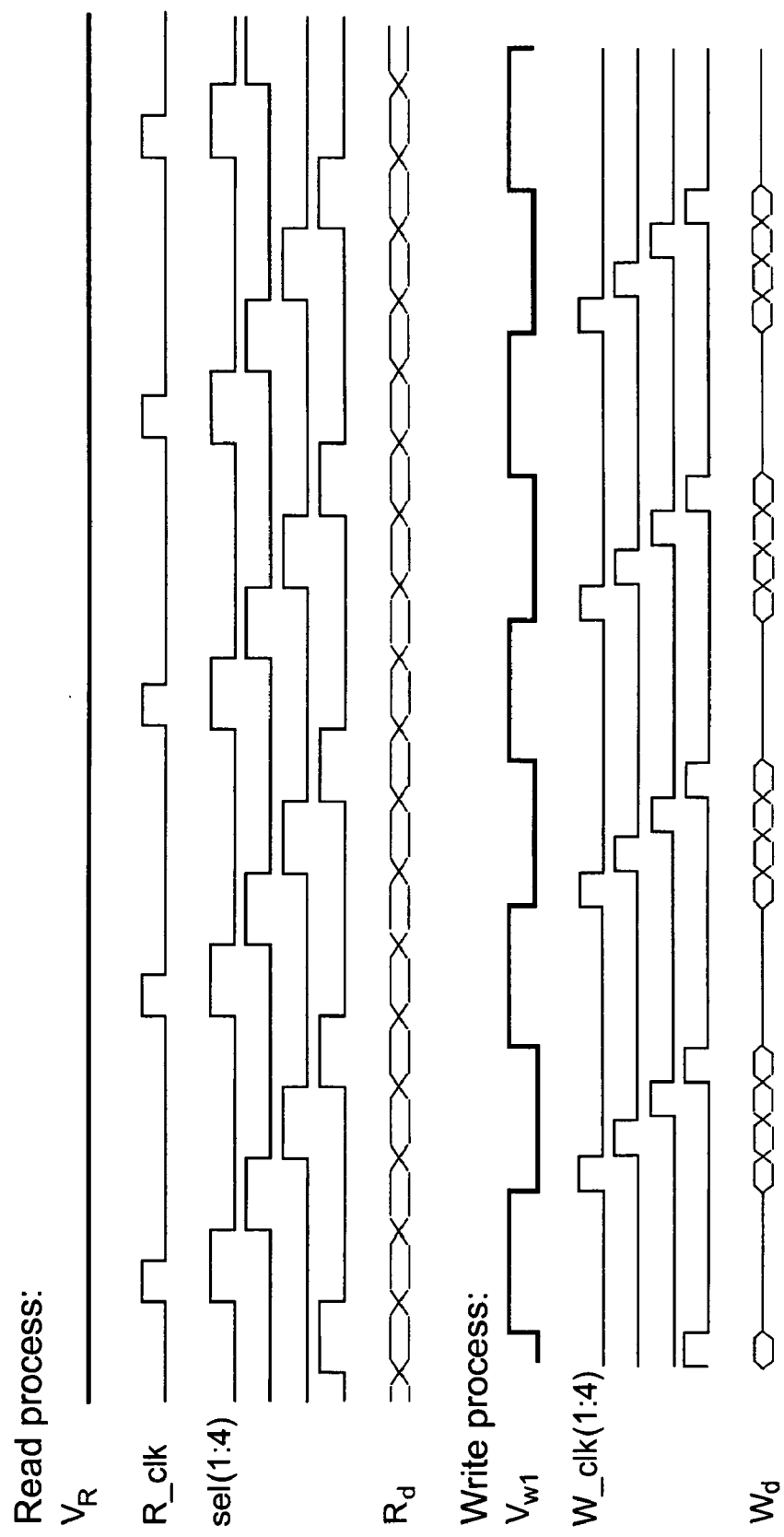
FIG. 14 shows a timing diagram for reading and writing in a subdevice with a 4×4 storage cell array.

The timing diagram for simultaneously reading from the storage subdevice 37 and writing into storage subdevice 35 is illustrated in FIG. 13. The timing diagram for signals controlling the read and write operations within a subdevice is depicted in FIG. 14, where DC reading is assumed.

The chip and storage cell architectures presented in FIGS. 11 and 12 include a per-cell A/D converter 40.

Figure 15:
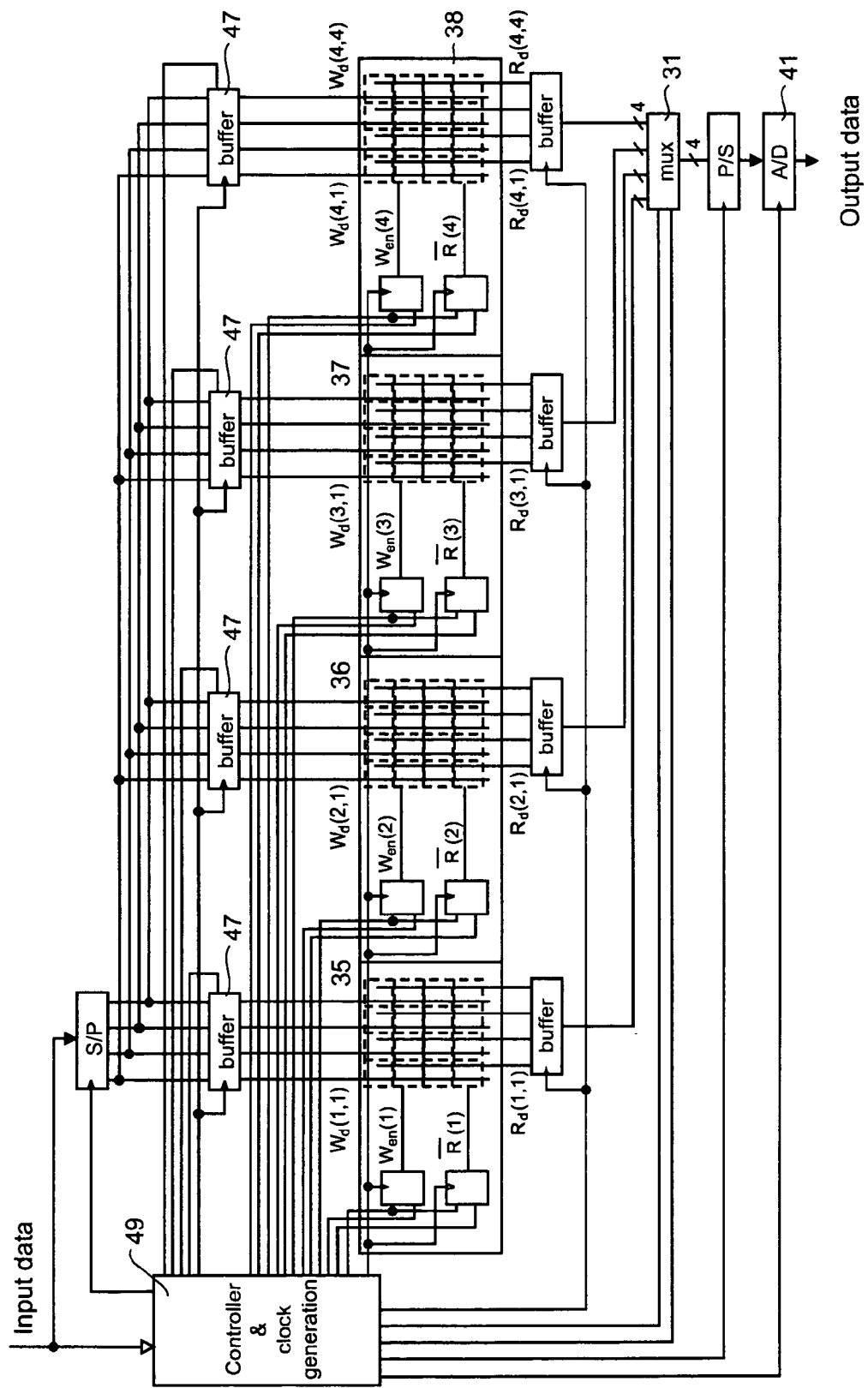
FIG. 15 shows an embodiment of a chip architecture with four subdevices and a global A/D conversion.
Figure 16:
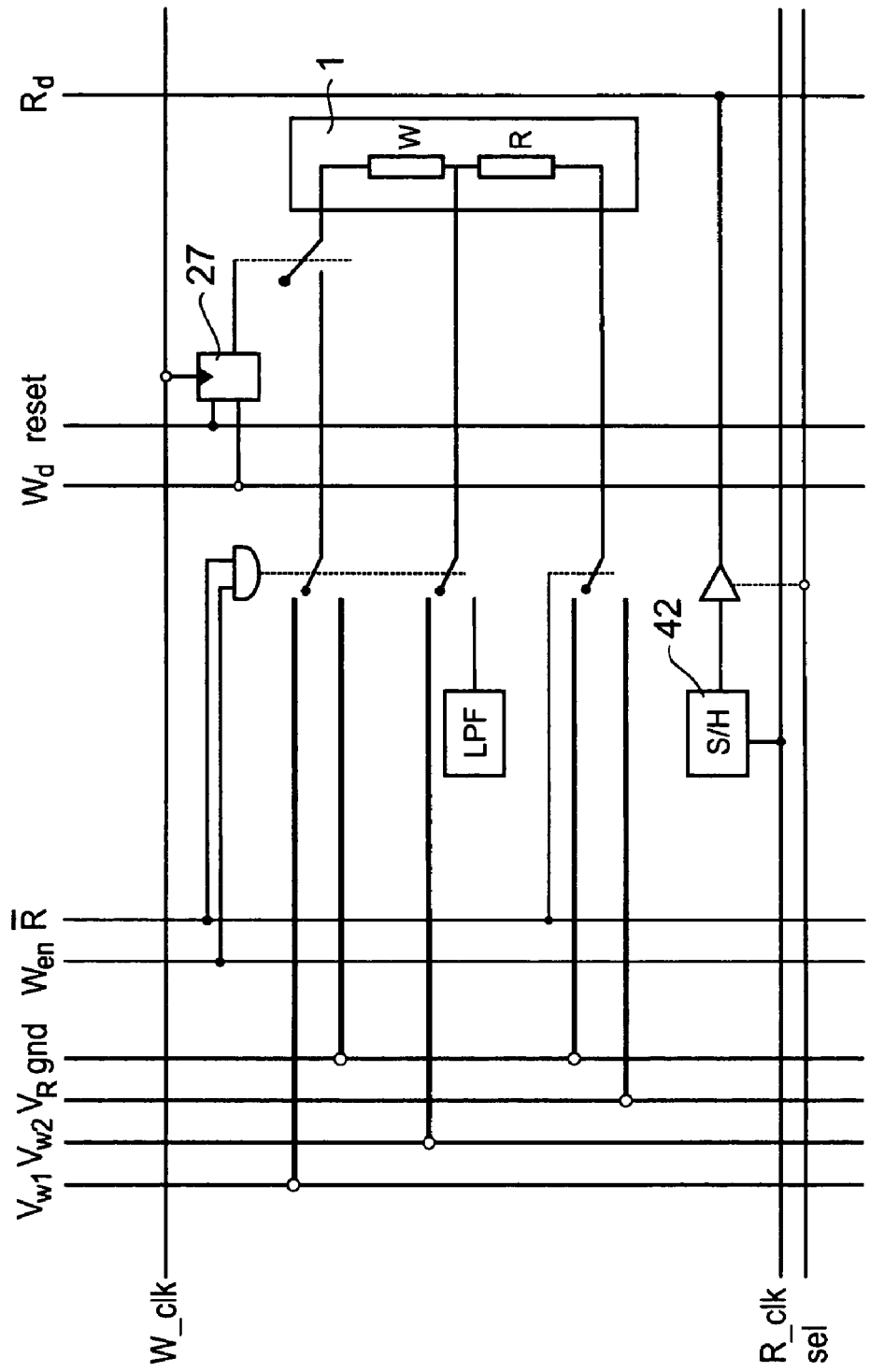
FIG. 16 shows an architecture of a single storage cell for the embodiment of FIG. 15 and a cantilever having three legs.

A simpler implementation is obtained if a single A/D converter 41 is employed for the entire storage device as illustrated in FIG. 15. In this case, at the sampling instants analog readback samples are generated at each storage cell by using a sample-and-hold element 42. The samples are then filtered by means of a low pass filter LPF and converted to the digital domain by the single A/D converter 41. The chip and cell architectures assuming a single A/D converter 41 are illustrated in FIGS. 15 and 16, respectively.

Figure 17:
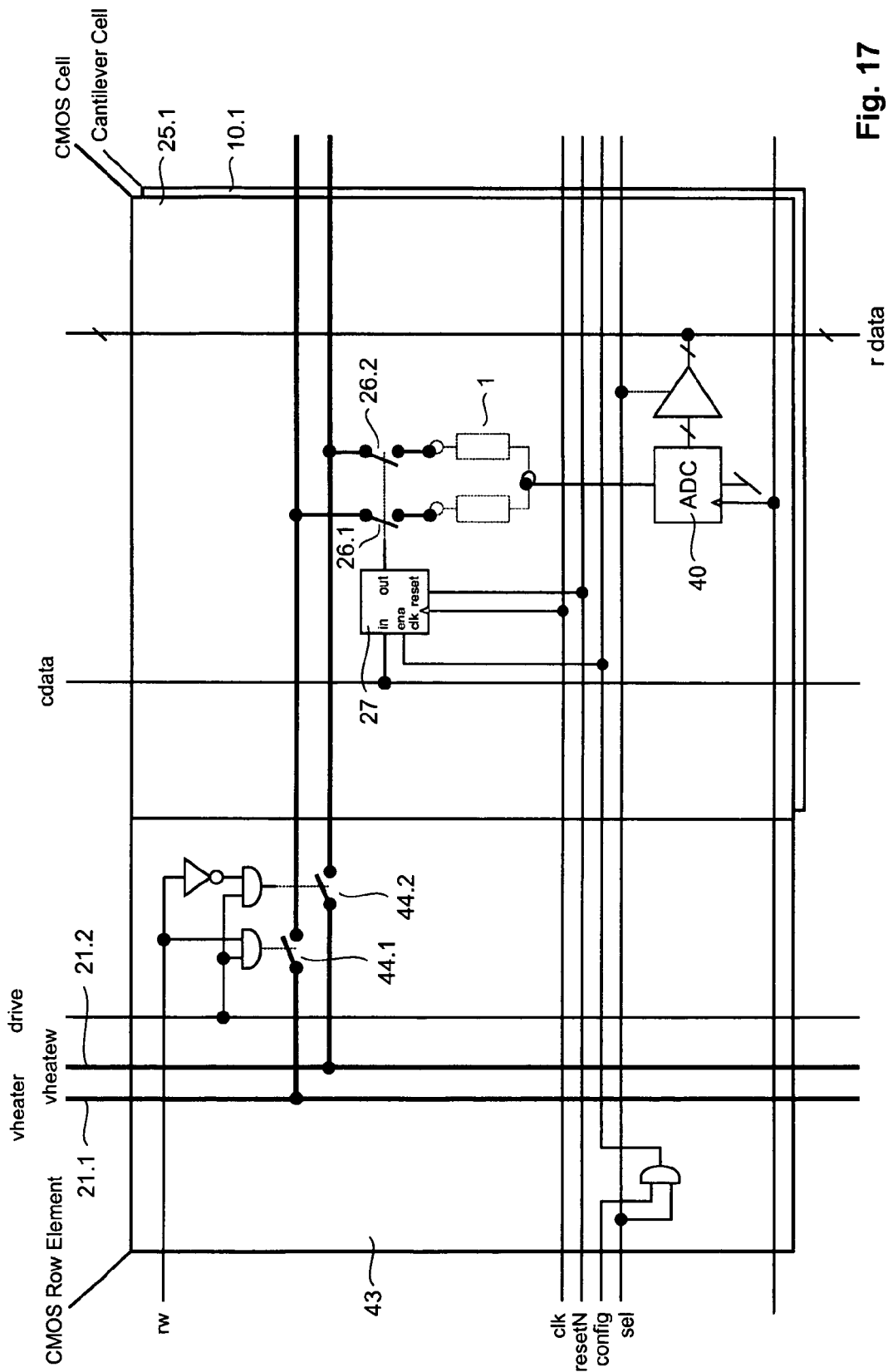
FIG. 17 shows an architecture of a single storage cell with complementary random dynamic cell allocation for either reading or writing and with simultaneous reading and writing in different rows.

An embodiment of a storage cell architecture for dynamic cell allocation is shown in FIG. 17. The block on the right side shows the single storage cell to be used in the fully scalable array, and the left part shows the control element 43 to be used in each row. With this embodiment a completely random dynamic cell allocation for either read or write and with simultaneous read and write operation in different rows is achievable. This architecture is shown for a three-leg cantilever design with two separate driving wires 21.1 and 21.2 within each row.

An alternative approach would use a single dual-purpose read/write driving wire per row with a two-sided read/write driving scheme according to FIG. 6 and FIG. 7 to minimize wiring complexity and size of the driving circuitry elements.

In the architecture of the embodiment depicted in FIG. 17, storage cells can be dynamically configured for parallel operation instead of the static predefined subdevice architectures of FIG. 11 and FIG. 12. Thus any completely random subset of the array can be dynamically configured for either parallel read or parallel write operation. However, simultaneous read and write operations can only be performed in different rows. This restriction is the cost for the benefit of reduced size and complexity. An alternative architecture without this restriction feeds the read and write driving signals to every storage cell of the array and uses two local memories in each storage cell instead of only one as described in a later embodiment.

To perform read operations on a random subset of the storage array, the corresponding rows have to be selected for reading by the signal rw during the read operation. The subset itself is previously selected by storing a single configuration bit ena into the storage cell's local memory 27 that controls the driving switches 26.1 and 26.2 in this storage cell. This is done in a random access memory like technique using the row select signals sel and config and the column input data signal cdata. With this scheme, the read subset of the array can be configured once and read operations can be performed continuously without reconfiguration. Readout of the data can be done very fast in a similar technique using the row select signal sel and the column output data signal rdata. This fast readout can be done between the time-consuming read operations without producing much temporal overhead. If the read data is buffered in the storage cell, the data can even be read out during the subsequent read operation thus allowing high flexibility in read access and producing no overhead at all.

Write operations can be performed with a scheme similar to the read operations. The rows have to be selected for writing by the signal rw during the write operation. Write data is previously stored into the storage cell's local memory using the signals sel, config and cdata. Only those storage cells are selected for write that are part of the chosen write subset and that are supposed to write a logical one. After a write operation, write data has to be reloaded before the next write operation. This temporal overhead can be eliminated by using an additional local memory in series to generate a pipeline-like buffer in the storage cell for storing the subsequent write data during the actual write operation.

There are different ways to efficiently control the signal rw for selecting the rows for read or write operation. If only storage cells of one row at a time are selected for read or write operation, the signal rw can simply be generated by a row decoder 46, 32 as shown in FIG. 6. In the more general case, where any row can be selected to be active for the read or write operation at the same time, a single-bit memory in each row can be used to control the signal rw. This memory can easily be accessed using the described row decoder.

Figure 18:
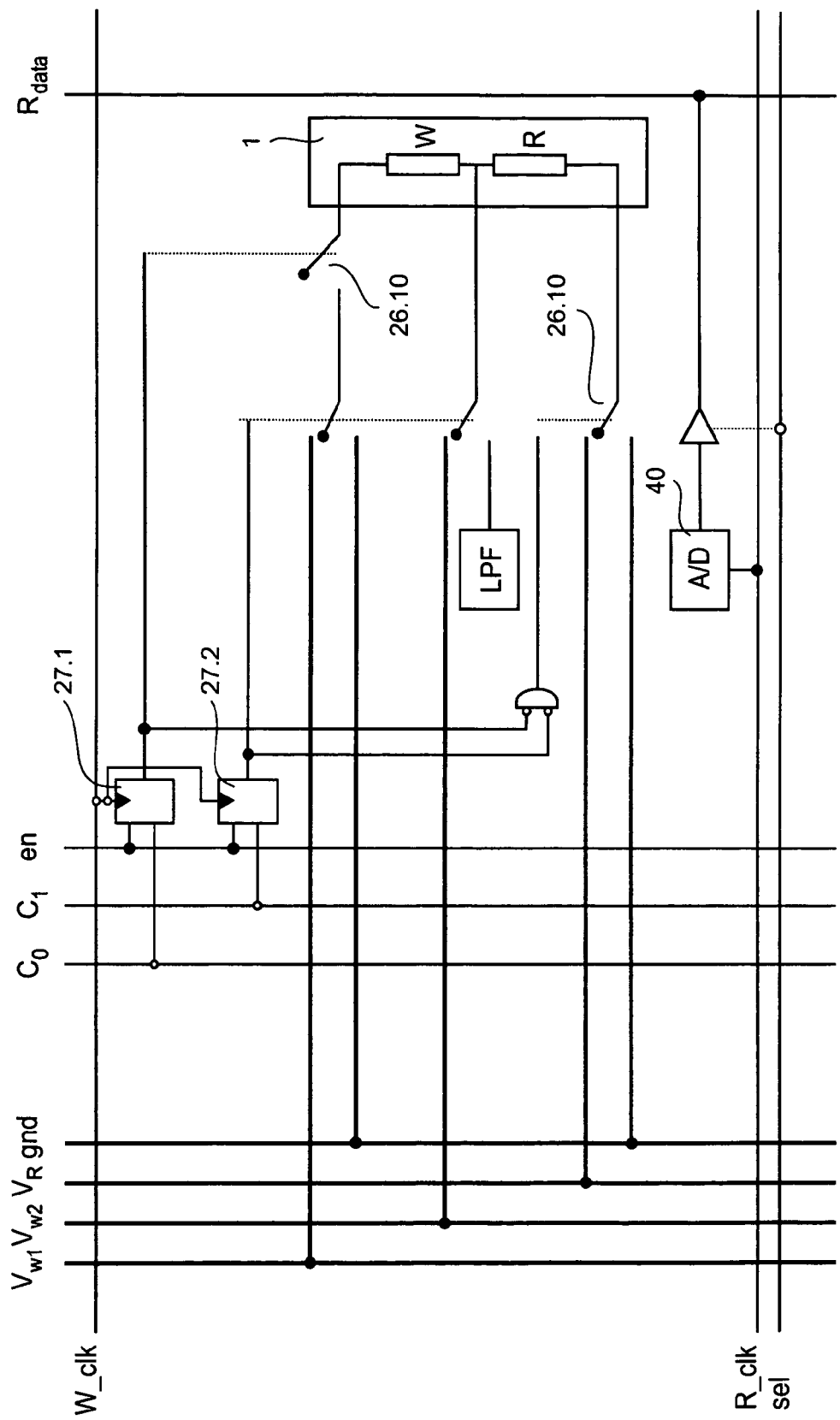
FIG. 18 shows an architecture of an individually configurable storage cell.

In the previous embodiments, some amount of flexibility in configuring each storage cell individually for read or write operations is sacrificed to reduce overall chip implementation complexity. For example, in the embodiment of FIG. 11 each storage subdevice is assigned a well-defined subset of the available storage cells, whereas in the embodiment of FIG. 6 all storage cells in a row are available at any time instant only either for read or for write. Full cell configurability and scalability is achieved by the cell architecture shown in FIG. 18. In this further cell embodiment, two flip-flops 27.1 and 27.2 are included to determine whether the storage cell must be configured for a read or a write operation, or remain idle, and, in case of a write operation, whether a 1 or a 0 must be written. The bits to be loaded on the cell memory elements 27.1 and 27.2 are conveyed by the lines $C0(i)$ and $C1(i)$, $i=1, \ldots, N$, where N denotes the number of columns in the storage array. The read and write operations are determined by the same control signal as in the embodiment of FIGS. 11 and 12. Note, however, that now the control and clock signals are not defined for a single storage subdevice but for the entire chip.

Having illustrated and described an advantageous embodiment for a novel method and apparatus for a local probe data storage device, it is noted that variations and modifications in the method and the apparatus can be made without departing from the spirit of the invention or the scope of the appended claims.

What is claimed is:

1. A method for storing data in a storage device, said method comprising:
providing a local probe data storage unit comprising a storage medium;
providing an address input and a data input;
providing an address and data evaluation unit with an AND-gate for controlling a controllable switch dependent on signals received from the address input and the data input;
connecting a read/write input to the local probe data storage unit via a controllable switch for applying a read/write signal to said local probe data storage unit dependent on a switching state of said switch;
connecting a first memory unit comprising a flip-flop to the address and data evaluation unit and to the controllable switch;
intermediately storing data from the read/write signal in the first memory unit;
applying a desired address to the address input; and
applying heating current to the read/write input after the desired address is applied to the address input and the data is applied to the data input.

2. The method of claim 1, further comprising:
mounting a tip on the local probe data storage unit for reading and writing data to and from the storage medium.

3. The method of claim 2, further comprising:
mounting the tip on a cantilever; and applying the read/write signal to the cantilever dependent on the switching state.

4. The method of claim 3 wherein mounting the tip on the cantilever comprises using a cantilever with a first and second leg for supporting the transmittal of a read signal, and the second leg and the third leg for supporting the transmittal of a write signal.

5. The method of claim 1 further comprising connecting a current limiter to the local probe data storage unit, said current limiter limiting a current of the read/write signal applied to the local probe data storage unit.

6. The method of claim 1 further comprising converting a sensed signal with an AD-converter.

7. The method of claim 1 further comprising intermediately storing data in a second memory unit comprising a second switch connected to the second memory unit.

8. A method for reading data from a storage device, said method comprising:
providing a local probe data storage unit comprising a storage medium;
providing an address input and a data input;
providing an address and data evaluation unit for controlling a controllable switch dependent on signals received from said address input and said data input, wherein said address and data evaluation unit comprises an AND-gate;
connecting a read/write input to the local probe data storage unit via a controllable switch for applying a read/write signal to said local probe data storage unit dependent on a switching state of said switch;
connecting a first memory unit comprising a flip-flop to the address and data evaluation unit and to the controllable switch;
intermediately storing data from the read/write signal in the first memory unit;
applying a desired address to the address input; and
applying heating current to the read/write input after the desired address is applied to the address input.

9. The method of claim 8, further comprising:
mounting a tip on the local probe data storage unit for reading and writing data to and from the storage medium.

10. The method of claim 9, further comprising:
mounting the tip on a cantilever; and
applying the read/write signal to the cantilever dependent on the switching state.

11. The method of claim 10 wherein mounting the tip on the cantilever comprises using a cantilever with a first and second leg for supporting the transmittal of a read signal, and the second leg and the third leg for supporting the transmittal of a write signal.

12. The method of claim 8 further comprising connecting a current limiter to the local probe data storage unit, said current limiter limiting a current of the read/write signal applied to the local probe data storage unit.

13. The method of claim 8 further comprising converting a sensed signal with an AD-converter.

14. The method of claim 8 further comprising intermediately storing data in a second memory unit comprising a second switch connected to the second memory unit.

* * * * *